United States Patent [19]

Föhl et al.

[11] Patent Number: 4,991,790
[45] Date of Patent: Feb. 12, 1991

[54] TIGHTENING DEVICE

[75] Inventors: Artur Föhl, Schornodorf; Jochen Dobelmann, Mutlangen, both of Fed. Rep. of Germany

[73] Assignee: TRW Repa GmbH, Fed. Rep. of Germany

[21] Appl. No.: 324,224

[22] Filed: Mar. 15, 1989

[30] Foreign Application Priority Data

Mar. 29, 1988 [DE] Fed. Rep. of Germany ....... 3810701

[51] Int. Cl.[5] ............................................. B65H 75/48
[52] U.S. Cl. ..................................... 242/107; 280/806
[58] Field of Search .......... 242/107, 107.4 R–107.4 E; 280/806, 807; 297/480

[56] References Cited

U.S. PATENT DOCUMENTS

| 4,165,844 | 8/1979 | Tanaka | 242/107 |
|---|---|---|---|
| 4,423,846 | 1/1984 | Fohl | 242/107 |
| 4,518,132 | 5/1985 | Schmidt | 242/107.4 R |
| 4,597,546 | 7/1986 | Yamamoto et al. | 242/107.4 R |
| 4,618,108 | 10/1986 | Butenop | 242/107 |
| 4,669,680 | 6/1987 | Nishimura | 242/107 |
| 4,669,751 | 6/1987 | Unger | 242/107 X |
| 4,907,820 | 3/1990 | Fohl | 280/806 |
| 4,925,123 | 5/1990 | Frei et al. | 242/107 |
| 4,396,858 | 8/1982 | Hollowell | 242/107 |

FOREIGN PATENT DOCUMENTS

| 2556400 | 12/1975 | Fed. Rep. of Germany . |
|---|---|---|
| 3215925 | 4/1982 | Fed. Rep. of Germany . |
| 3407378 | 2/1984 | Fed. Rep. of Germany . |

Primary Examiner—William A. Cuchlinski, Jr.
Assistant Examiner—Joseph A. Rhoa
Attorney, Agent, or Firm—Tarolli, Sundheim & Covell

[57] ABSTRACT

Two coupling pawls are mounted eccentrically and pivotably in their center of gravity on a drive pulley of the tightening rotary drive. A coupling ring is non-rotatably connected to the belt coiling shaft of the belt retractor. The coupling ring comprises an internal toothing into which the coupling pawls are driven solely by the action of inertia forces to establish a coupling connection. The coupling pawls are offset in the peripheral direction with respect to each other by an angle which corresponds to an odd multiple of half the pitch of the internal toothing of the coupling ring.

5 Claims, 2 Drawing Sheets

TIGHTENING DEVICE

The present invention relates to a tightening device in a belt retractor of a motor vehicle safety belt restraining system comprising a tightening rotary drive on the drive pulley of which a coupling pawl is mounted eccentrically pivotably on the side face facing the belt retractor, and a coupling ring which is non-rotatably connected to the belt coiling shaft of the belt retractor and comprises an internal toothing which lies opposite the coupling pawl and into which the latter can be driven by pivoting about its eccentric pivot bearing by the sudden initiation of the rotary movement of the drive pulley for establishing a coupling connection between the drive pulley and the coupling ring.

In such a tightening device the pivoting of the coupling pawl into engagement with the internal toothing of the coupling ring takes place under the action of centrifugal forces and inertia forces. The contribution made by the centrifugal forces for driving the coupling pawl into coupling engagement with the internal toothing of the coupling ring depends as is known on the square of its speed of rotation. The pivoting of the coupling pawl into the immediate vicinity of the internal toothing of the coupling ring does not occur until the drive pulley has already reached a relatively high speed of rotation. There is then however the danger that the tip of the coupling tooth of the coupling pawl will strike the tip of a tooth of the internal toothing of the coupling ring with a correspondingly high relative speed and rebound from said ring. When such a rebounding of the coupling pawl at the internal toothing of the coupling ring has occurred there is no longer any guarantee that a coupling connection is established. Consequently, with the conventional tightening device described there is a considerable danger that a tightening will not occur.

The invention provides a tightening device of the type described above which ensures in simple manner and permitting economic mass production a reliable coupling engagement of the coupling pawl into the internal toothing of the coupling ring.

This is achieved according to the invention in a tightening device of the type defined at the outset by mounting the coupling pawl in its center of gravity. The driving of the coupling pawl into the internal toothing of the coupling ring thus takes place solely under the action of the inertia forces which depend only on the rotational acceleration. The rotational acceleration of the drive pulley or disc is however particularly high at the start of the tightening operation, in contrast to the rotational speed which must first be built up. Due to the extremely high rotational acceleration of the drive pulley present at the start of the tightening operation the coupling pawl is brought into engagement with the internal toothing of the coupling ring before the drive pulley has reached a high rotational speed. Should the tooth tip of the coupling pawl strike a tooth tip of the internal toothing of the coupling ring the bouncing effect is thus correspondingly small and consequently immediately thereafter coupling engagement is established.

With an advantageous further development of the invention it is also ensured that the coupling connection is immediately established even in the improbable case of tooth rebound.

According to this embodiment on the drive pulley a second coupling pawl is eccentrically pivotably mounted and is offset with respect to the first coupling pawl in the peripheral direction of the drive pulley by an angle which corresponds to an odd multiple of half the pitch of the internal toothing of the coupling ring. If therefore a coupling pawl strikes with its tooth tip against a tooth tip of the internal toothing of the coupling ring the tooth tip of the other coupling pawl is certain to engage a tooth gap. Consequently, possible tooth rebound has no detrimental effect whatever.

By suitable means, which are overcome on activation of the tightening drive, the or each coupling pawl is held in its rest position so as not to impair the normal function of the belt retractor. Said means may be formed by a shearable retaining element or a return spring. Preferably, a return spring is used because with such an embodiment the important advantage is achieved that after termination of a tightening operation the coupling connection can be released again by slightly turning the coupling ring further in the tightening direction, whereupon the coupling pawl is pivoted back by the return spring into its rest position.

Further advantages and features of the invention will be apparent from the following description of a preferred embodiment and from the drawings to which reference is made and in which.

Figure 1:
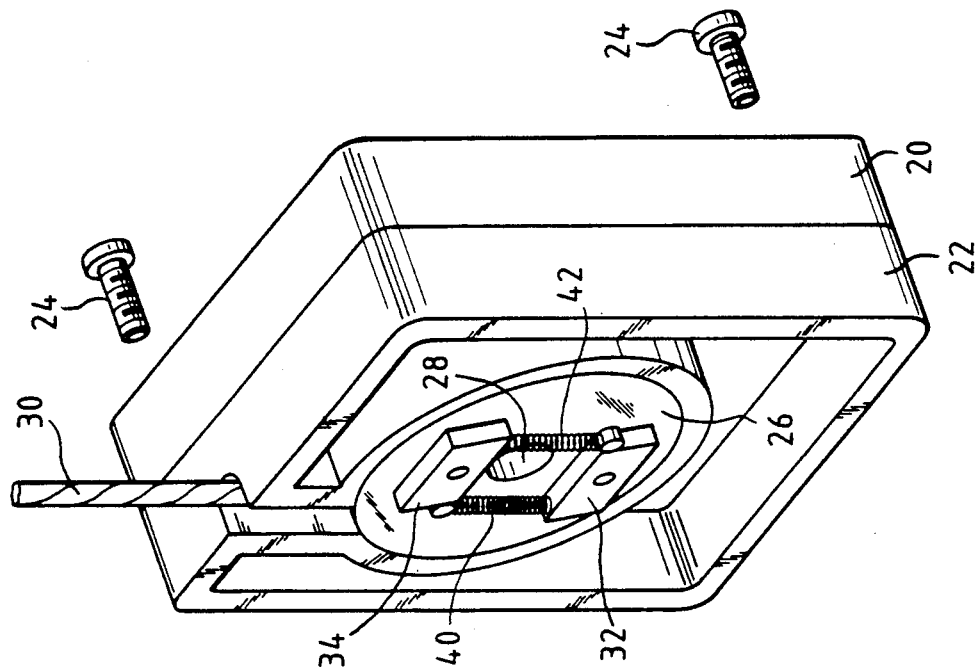
FIG. 1 is a perspective schematic view of a belt retractor with tightening device in separated illustration.
Figure 1:
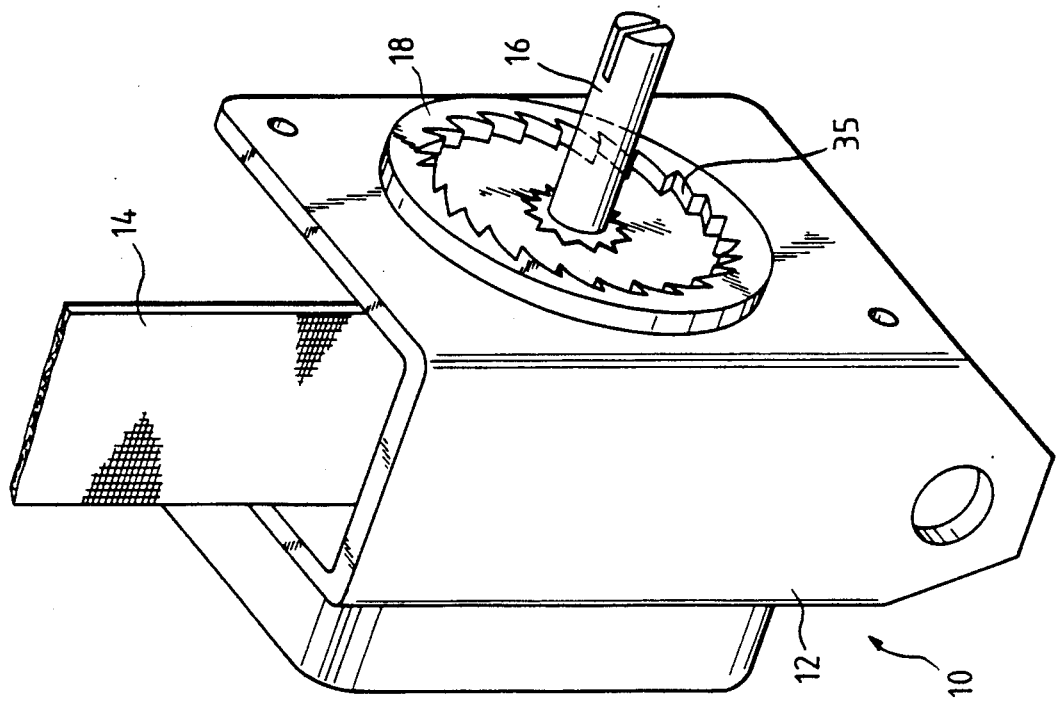

In FIG. 1 two component assemblies can be seen which are shown in a separate condition solely to facilitate the illustration of the invention. The assembly shown on the left forms a belt retractor of usual construction. This retractor, denoted generally by 10, comprises a housing 12 in the form of a U-shaped frame in the side plates of which a belt coiling shaft is rotatably mounted, on which the webbing 14 is coiled. The belt coiling shaft comprises a shaft extension 16 which projects laterally out of the housing 12 and on which a coupling ring 18 is non-rotatably mounted by form-locking.

The assembly shown on the right in FIG. 1 includes a housing part 22 provided with a cover cap 20 and secured by means of screws 24 to a side plate of the housing 12. The housing part 22 surrounds a drive pulley 26 which is held thereon by a shearing pin or the like and has a bore 28 for rotatable mounting on the shaft extension 16. The drive pulley 26 is a pulley in the peripheral groove of which several turns of a pulling cable 30 are inserted. The free end of the pulling cable 30 is connected to a linear tightening drive, in particular to the piston of a pyrotechnical piston/cylinder drive. At the side of the drive pulley 26 facing the belt retractor 10 two coupling pawls 32, 34 are pivotably eccentrically mounted. The coupling pawls 32, 34 lie opposite an internal toothing 35 of the coupling ring 18. Each coupling pawl 32, 34 is of parallelogram form in plan view (FIGS. 2 to 4) and pivotally mounted in its centre of gravity on a bearing pin 36 or 38 mounted on the drive pulley 26. The coupling pawls 32, 34 each have a coupling tooth Z formed by an acute corner of the parallelogram configuration. On the side remote from the internal toothing 35 a pressure spring 40 and 42 respectively bears with its one end on each pawl 32, 34 and the other end thereof bears on an abutment 44 and 46 respectively which is mounted on the drive pulley 26 and serves at the same time as stop for the adjacent coupling pawl 32 and 34. The pressure springs 40, 42 hold the coupling pawls 32, 34 resiliently in their rest position defined by the abutments 44, 46 out of engagement with the internal toothing 35 of the coupling ring 18.

Figure 2:
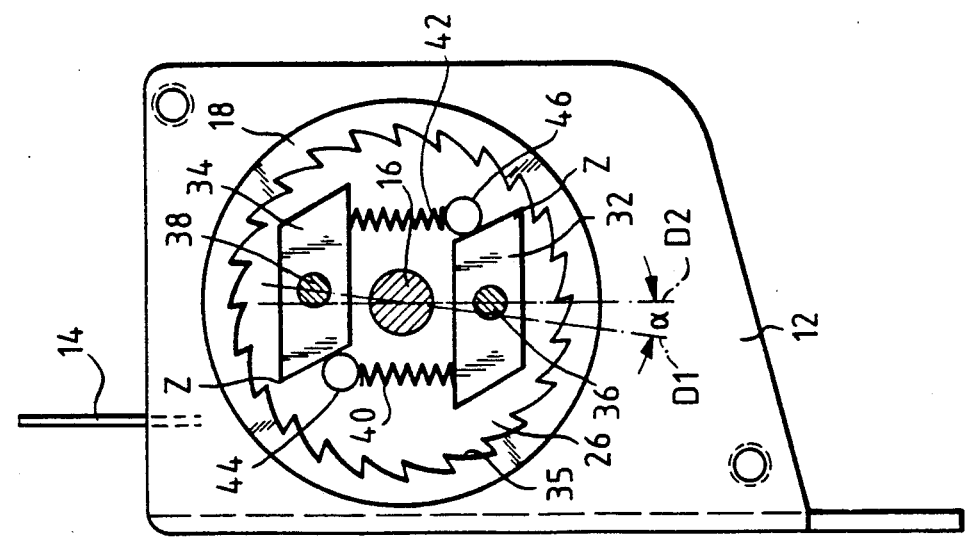

FIG. 2 shows both pawls 32, 34 in the rest condition.

The coupling pawls 32, 34 are only approximately diametrically opposite. In FIG. 2 two diameters D1 and D2 are shown, the diameter D1 extending through the axis of the shaft extension 16 and the axis of the bearing pin 38 whilst the diameter D2 extends through the axis of the shaft extension 16 and the axis of the bearing pin 36. The two diameters D1 and D2 are turned with respect to each other through an angle α which corresponds substantially to half the tooth pitch of the internal toothing 35. The coupling pawls 32, 34 are thus offset in the peripheral direction of the drive pulley 26 with respect to each other by an angle which corresponds to an odd multiple of half the pitch of the internal toothing 35.

Figure 3:
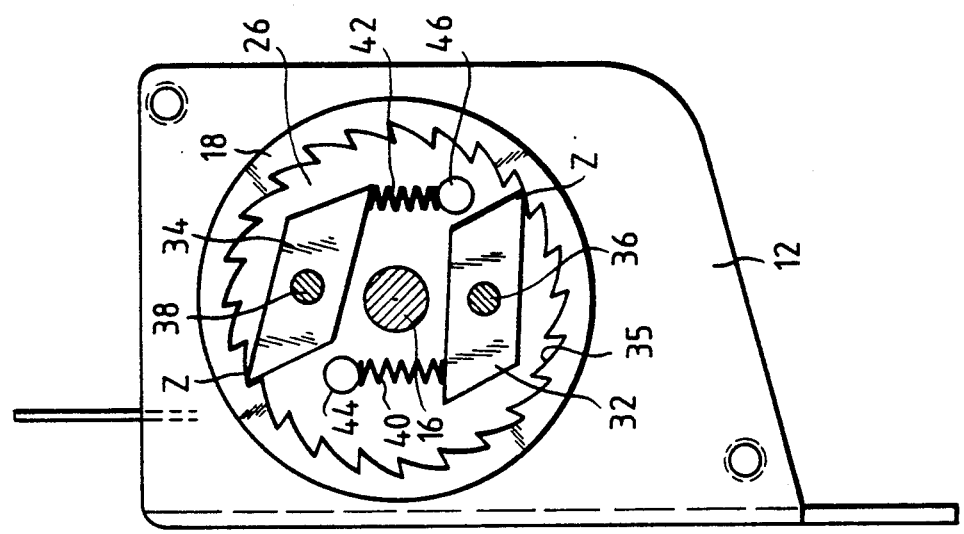

FIG. 3 shows both coupling pawls 32, 34 in the engaged state which arises immediately after the start of a tightening operation solely due to inertial forces because the coupling pawls are each mounted in their centre of gravity. Whereas the coupling pawl 34 with its tooth tip Z moves into the bottom of a tooth gap between two consecutive teeth of the internal toothing 35, the tooth tip Z lies substantially in the centre of a tooth back between a tooth tip and the bottom of the corresponding tooth gap of the internal toothing 35. In this state a satisfactory coupling connection is established between the drive pulley 26 and the coupling ring 18.

Figure 4:
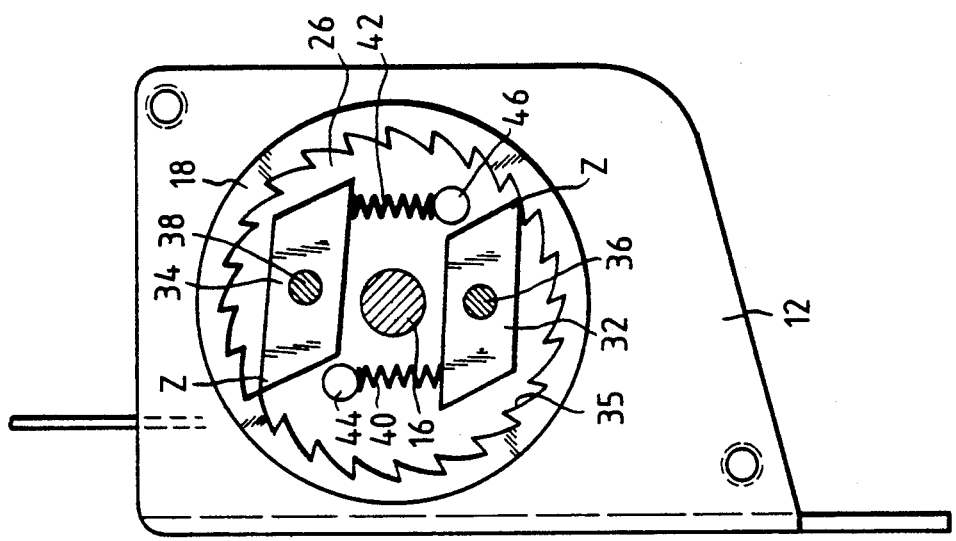
FIGS. 2, 3 and 4 are schematic side views which illustrate the function of the coupling means between the drive pulley and coupling ring in various functional states.

In the function state shown in FIG. 4 the tooth tip Z of the coupling pawl 34 exactly meets a tip of the toothing 35. Any rebounding of the coupling pawl 34 cannot impair the immediate establishment of a coupling connection because at the same time the coupling pawl 32 with its tooth tip Z moves into a tooth gap between two adjacent teeth of the internal toothing 35 and on subsequent relative rotation between drive pulley 26 and coupling ring 18 through only a few degrees the coupling pawl 32 engages drivingly into the internal toothing 35.

After effected tightening the coupling pawls 32, 34 are pivoted by the associated pressure springs 40, 42 back into their rest position shown in FIG. 2 so that the coupling ring 18 and consequently the shaft extension 16 and the belt coiling shaft are uncoupled from the drive pulley 26. To release the tooth tips Z of the coupling pawls 32, 34 from the internal toothing 35 a slight rotation of the coupling ring 18 in the belt retraction direction may be necessary and this can take place under the action of the retraction spring of the belt retractor 10. Such a rotation may in any case be necessary to deactivate the locking mechanism of the belt retractor after an accident.

The magnitude of the offsetting of the two coupling pawls 32, 34 with respect to each other in the peripheral direction is defined in accordance with the tooth geometry so that firstly should two tooth tips strike each other the respective other pawl is certain with its tip not to strike a tooth tip as well and secondly on rebound of the one pawl the angle of rotation before the other pawl engages into a tooth gap is as small as possible.

We claim:

1. A tightening device on a belt tractor of a motor vehicle safety belt restraining system, comprising an emergency tightening rotary drive including a drive pulley whereon a first coupling pawl is eccentrically and pivotably mounted on a side face of said drive pulley facing the belt retractor by means of a pivot bearing, and a coupling ring which is connected to the belt coiling shaft of the belt retractor for joint rotation with said shaft and comprises an internal toothing which lies opposite said first coupling pawl and into which said first coupling pawl can be driven by pivoting about said pivot bearing by a sudden initiation of rotary movement of said drive pulley for establishing a coupling connection between said drive pulley and said coupling ring, said first coupling pawl being mounted in its center of gravity, and a second coupling pawl being pivotably and eccentrically mounted on said drive pulley, said first and second coupling pawls having engagement faces which are offset with respect to each other in the peripheral direction of said drive pulley by an angle which corresponds at least approximately to an odd multiple of half the pitch of the internal toothing of said coupling ring, and said first and second coupling pawls being biased by spring means into a rest position out of engagement with said internal toothing of said coupling ring.

2. The tightening device according to claim 1, wherein said first coupling pawl is parallelogram-shaped and has an acute corner which forms the tip of a coupling tooth.

3. The tightening device according to claim 1, wherein said coupling pawls are arranged approximately diametrically opposite each other.

4. The tightening device according to claim 1, wherein said coupling pawls are identically shaped.

5. The tightening device according to claim 1, wherein each coupling pawl is biased by a pressure spring into a rest position, each spring bearing with one of its ends on the associated coupling pawl and with the other of its ends on an abutment which is mounted on said drive pulley and acts at the same time as a stop for an adjacent coupling pawl for defining said rest position thereof out of engagement with said internal toothing of the said coupling ring.

* * * * *

UNITED STATES PATENT AND TRADEMARK OFFICE
CERTIFICATE OF CORRECTION

PATENT NO. : 4,991,790

DATED : February 12, 1991

INVENTOR(S) : Artur Fohl, and Jochen Dobelmann

It is certified that error appears in the above-identified patent and that said Letters Patent is hereby corrected as shown below:

Column 4, Line 12, Claim 1, change "tractor" to --retractor--.

Signed and Sealed this

Thirtieth Day of June, 1992

Attest:

DOUGLAS B. COMER

Attesting Officer    Acting Commissioner of Patents and Trademarks